US011552718B2

(12) United States Patent
Abedini et al.

(10) Patent No.: US 11,552,718 B2
(45) Date of Patent: Jan. 10, 2023

(54) BEAM REFINEMENT AND LOCALIZATION USING TRUE-TIME-DELAY ANALOG ARRAYS

(71) Applicant: QUALCOMM Incorporated, San Diego, CA (US)

(72) Inventors: Navid Abedini, Basking Ridge, NJ (US); Juergen Cezanne, Ocean Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/302,795

(22) Filed: May 12, 2021

(65) Prior Publication Data

US 2022/0368436 A1    Nov. 17, 2022

(51) Int. Cl.
*H04B 7/06* (2006.01)
*H04B 17/27* (2015.01)
*H04W 74/08* (2009.01)
*H04B 7/08* (2006.01)

(52) U.S. Cl.
CPC ........... *H04B 17/27* (2015.01); *H04B 7/0695* (2013.01); *H04B 7/088* (2013.01); *H04W 74/0833* (2013.01)

(58) Field of Classification Search
CPC ...... H04B 17/27; H04B 7/0695; H04B 7/088; H04W 74/0833
See application file for complete search history.

(56) References Cited

U.S. PATENT DOCUMENTS

| | | | |
|---|---|---|---|
| 10,998,945 B1* | 5/2021 | Baligh | H04B 7/0617 |
| 2017/0366311 A1* | 12/2017 | Iyer | H04B 7/0482 |
| 2018/0167946 A1* | 6/2018 | Si | H04L 5/00 |
| 2018/0235008 A1* | 8/2018 | Park | H04W 16/28 |
| 2019/0058538 A1* | 2/2019 | Sun | H04L 5/0064 |
| 2019/0379441 A1* | 12/2019 | Priyanto | H04W 16/28 |
| 2020/0220676 A1* | 7/2020 | Xu | H04L 5/0094 |
| 2021/0175919 A1* | 6/2021 | Badic | H04W 72/1231 |
| 2022/0014935 A1* | 1/2022 | Haija | H04B 17/336 |

\* cited by examiner

*Primary Examiner* — Kenneth T Lam
(74) *Attorney, Agent, or Firm* — Harrity & Harrity LLP/Qualcomm Incorporated

(57) ABSTRACT

Various aspects of the present disclosure generally relate to wireless communication. In some aspects, a transmitter device may transmit, using a frequency-domain beam sweeping configuration, a wideband signal, wherein a pointing direction of a first beam conveying the wideband signal changes continuously with respect to a frequency domain, and wherein each resource element of the wideband signal has a different pointing direction. The transmitter device may receive a report associated with a set of measurements of the wideband signal performed by a receiver device. The transmitter device may communicate using a second beam that has a beam direction determined based at least in part on the received report. Numerous other aspects are described.

30 Claims, 11 Drawing Sheets

BEAM REFINEMENT AND LOCALIZATION USING TRUE-TIME-DELAY ANALOG ARRAYS

FIELD OF THE DISCLOSURE

Aspects of the present disclosure generally relate to wireless communication and to techniques and apparatuses for beam refinement and localization using true-time-delay analog arrays.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a transmitter device includes transmitting, using a frequency-domain beam sweeping configuration, a wideband signal over a first beam, wherein each resource element of the wideband signal has a pointing direction that is different from the pointing direction of each other resource element of the wideband signal; receiving a report associated with a set of measurements of the wideband signal performed by a receiver device; and communicating using a second beam that has a beam direction determined based at least in part on the received report.

In some aspects, a method of wireless communication performed by a receiver device includes receiving a wideband signal over a first beam, wherein each resource element of the wideband signal has a pointing direction that is different from the pointing direction of each other resource element of the wideband signal; determining a set of measurements of the wideband signal based at least in part on receiving the wideband signal; transmitting a report associated with the set of measurements of the wideband signal; and communicating using a second beam that has a beam direction determined based at least in part on the report associated with the set of measurements of the wideband signal.

In some aspects, a transmitter device for wireless communication includes a memory; and one or more processors, coupled to the memory, configured to: transmit, using a frequency-domain beam sweeping configuration, a wideband signal over a first beam, wherein each resource element of the wideband signal has a pointing direction that is different from the pointing direction of each other resource element of the wideband signal; receive a report associated with a set of measurements of the wideband signal performed by a receiver device; and communicate using a second beam that has a beam direction determined based at least in part on the received report.

In some aspects, a receiver device for wireless communication includes a memory; and one or more processors, coupled to the memory, configured to: receive a wideband signal over a first beam, wherein each resource element of the wideband signal has a pointing direction that is different from the pointing direction of each other resource element of the wideband signal; determine a set of measurements of the wideband signal based at least in part on receiving the wideband signal; transmit a report associated with the set of measurements of the wideband signal; and communicate using a second beam that has a beam direction determined based at least in part on the report associated with the set of measurements of the wideband signal.

In some aspects, a non-transitory computer-readable medium storing a set of instructions for wireless communication includes one or more instructions that, when executed by one or more processors of a transmitter device, cause the transmitter device to: transmit, using a frequency-domain beam sweeping configuration, a wideband signal over a first beam, wherein each resource element of the wideband signal has a pointing direction that is different from the pointing direction of each other resource element of the wideband signal; receive a report associated with a set of measurements of the wideband signal performed by a receiver device; and communicate using a second beam that has a beam direction determined based at least in part on the received report.

In some aspects, a non-transitory computer-readable medium storing a set of instructions for wireless communication includes one or more instructions that, when executed by one or more processors of a receiver device, cause the receiver device to: receive a wideband signal over a first beam, wherein each resource element of the wideband signal has a pointing direction that is different from the pointing direction of each other resource element of the wideband signal; determine a set of measurements of the wideband signal based at least in part on receiving the wideband signal; transmit a report associated with the set of measurements of the wideband signal; and communicate using a second beam that has a beam direction determined based at least in part on the report associated with the set of measurements of the wideband signal.

In some aspects, an apparatus for wireless communication includes means for transmitting, using a frequency-domain beam sweeping configuration, a wideband signal over a first beam, wherein each resource element of the wideband signal has a pointing direction that is different from the pointing direction of each other resource element of the wideband signal; means for receiving a report associated with a set of measurements of the wideband signal performed by a receiver device; and means for communicating using a second beam that has a beam direction determined based at least in part on the received report.

In some aspects, an apparatus for wireless communication includes means for receiving a wideband signal over a first beam, wherein each resource element of the wideband signal has a pointing direction that is different from the pointing direction of each other resource element of the wideband signal; means for determining a set of measurements of the wideband signal based at least in part on receiving the wideband signal; means for transmitting a report associated with the set of measurements of the wideband signal; and means for communicating using a second beam that has a beam direction determined based at least in part on the report associated with the set of measurements of the wideband signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
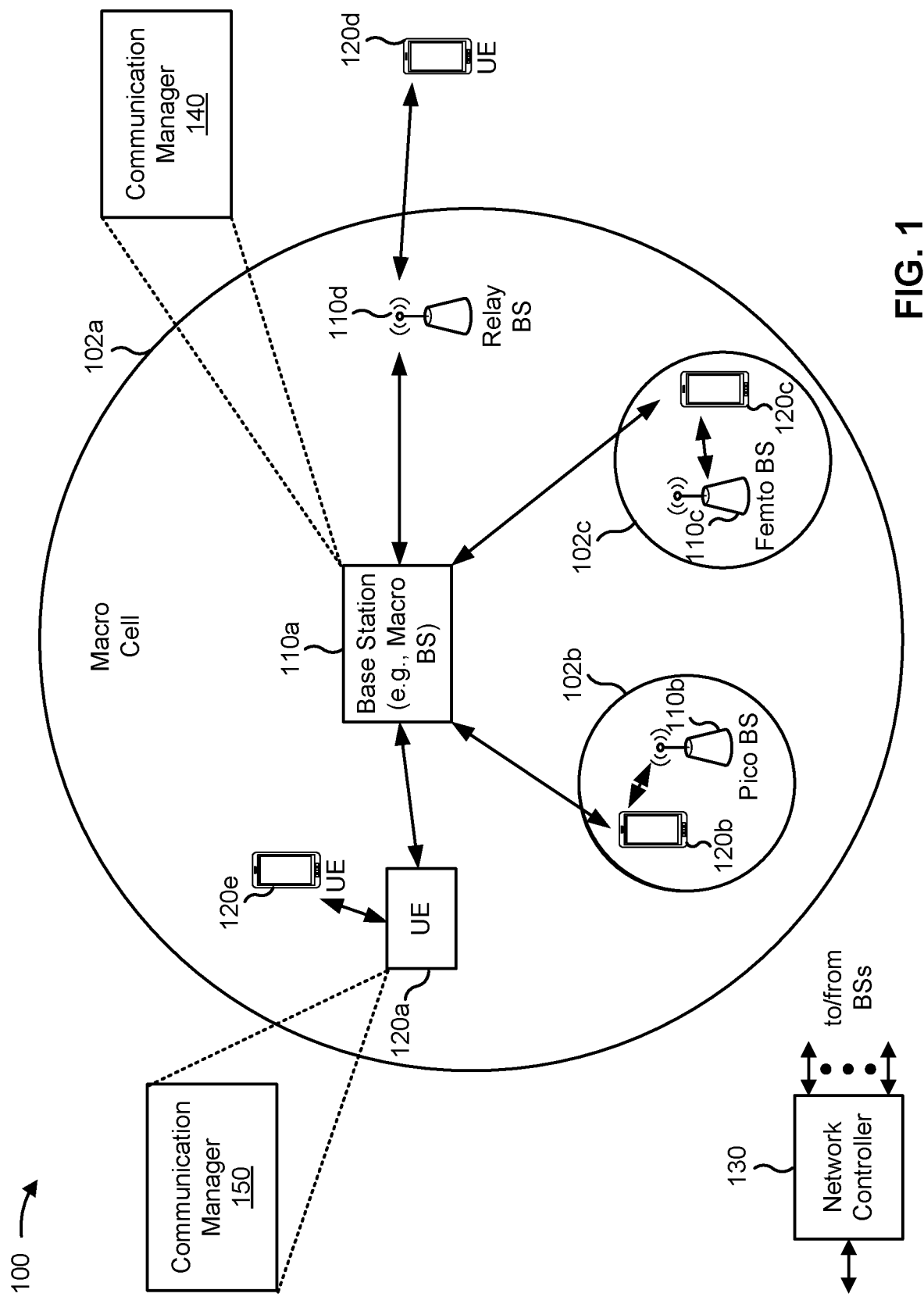
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a transmitter device (e.g., a BS 110) may include a communication manager 140. As described in more detail elsewhere herein, the communication manager 140 may transmit, using a frequency-domain beam sweeping configuration, a wideband signal over a first beam, wherein each resource element of the wideband signal has a pointing direction that is different from the pointing direction of each other resource element of the wideband signal; receive a report associated with a set of measurements of the wideband signal performed by a receiver device; and communicate using a second beam that has a beam direction determined based at least in part on the received report. Additionally, or alternatively, the communication manager 140 may perform one or more other operations described herein.

In some aspects, a receiver device (e.g., a UE 120) may include a communication manager 150. As described in more detail elsewhere herein, the communication manager 150 may receive a wideband signal over a first beam, wherein each resource element of the wideband signal has a pointing direction that is different from the pointing direction of each other resource element of the wideband signal; determine a set of measurements of the wideband signal based at least in part on receiving the wideband signal; transmit a report associated with the set of measurements of the wideband signal; and communicate using a second beam that has a beam direction determined based at least in part on the report associated with the set of measurements of the wideband signal. Additionally, or alternatively, the communication manager 150 may perform one or more other operations described herein.

As indicated above, FIG. 1 is provided as an example. Other examples may differ from what is described with regard to FIG. 1.

Figure 2:
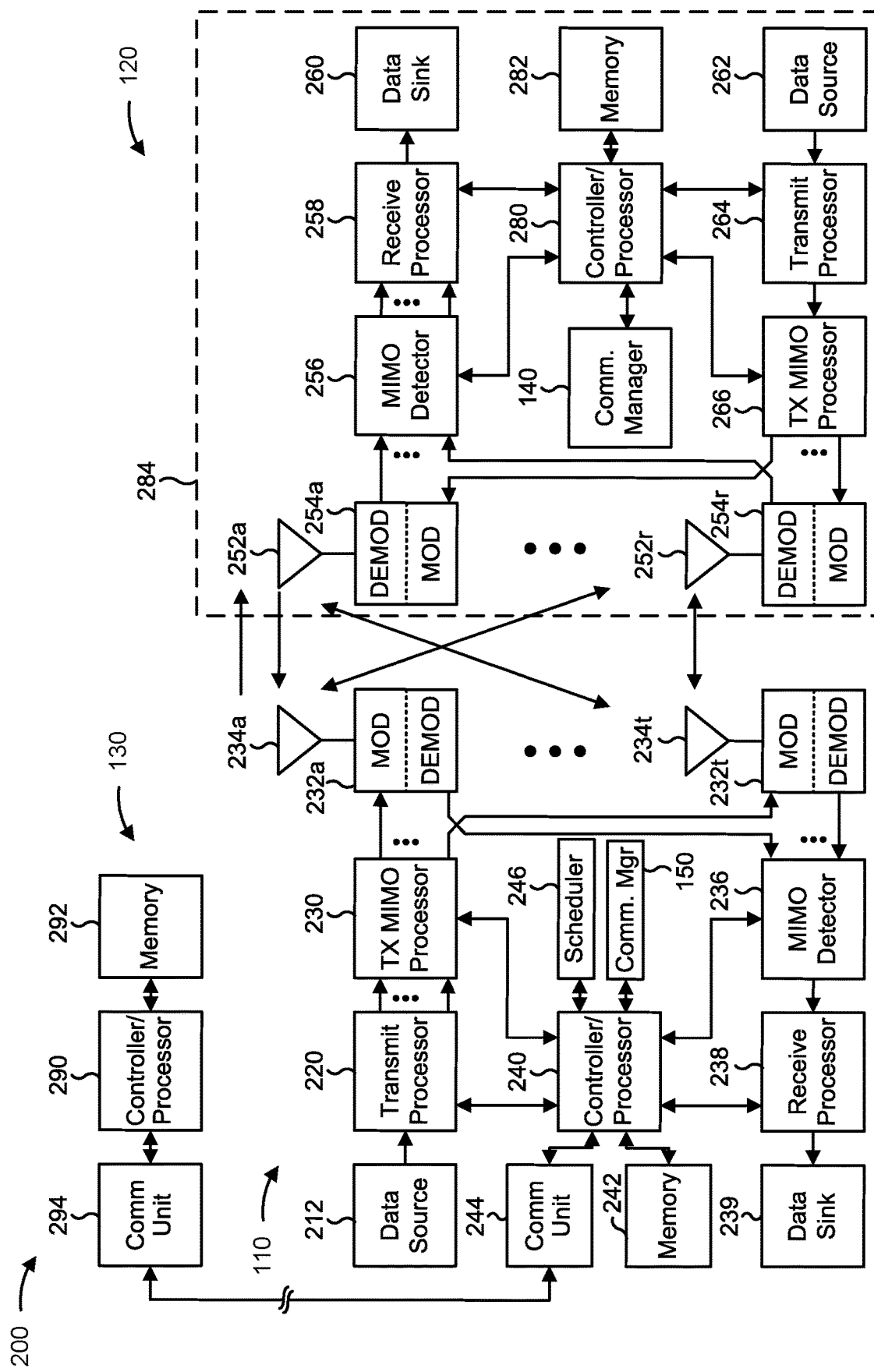
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6A-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6A-8).

Controller/processor 240 of base station 110, controller/processor 280 of UE 120, and/or any other component(s) of FIG. 2 may perform one or more techniques associated with beam refinement and localization using true-time-delay and analog arrays, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, the transmitter device or the receiver device described herein may be the base station 110 or the UE 120, may be included in the base station 110 or the UE 120, or may include one or more components of the base station 110 or the UE 120 shown in FIG. 2. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the transmitter device includes means for transmitting (e.g., using controller/processor 240, transmit processor 220, TX MIMO processor 230, MOD 232, antenna 234, memory 242, or the like), using a frequency-domain beam sweeping configuration, a wideband signal over a first beam, wherein each resource element of the wideband signal has a pointing direction that is different from the pointing direction of each other resource element of the wideband signal; means for receiving (e.g., using antenna 234, DEMOD 232, MIMO detector 236, receive processor 238, controller/processor 240, memory 242, or the like) a report associated with a set of measurements of the wideband signal performed by a receiver device; and/or means for communicating (e.g., using antenna 234, DEMOD 232, MIMO detector 236, receive processor 238, transmit processor 220, TX MIMO processor 230, MOD 232, controller/processor 240, memory 242, or the like) using a second beam that has a beam direction determined based at least in part on the received report. In some aspects, the means for the transmitter device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the receiver device includes means for receiving (e.g., using antenna 252, DEMOD 254, MIMO detector 256, receive processor 258, controller/processor 280, memory 282, or the like) a wideband signal over a first beam, wherein each resource element of the wideband signal has a pointing direction that is different from the pointing direction of each other resource element of the wideband signal; means for determining (e.g., using antenna 252, DEMOD 254, MIMO detector 256, receive processor 258, controller/processor 280, memory 282, or the like) a set of measurements of the wideband signal based at least in part on receiving the wideband signal; means for transmitting (e.g., using controller/processor 280, transmit processor 264, TX MIMO processor 266, MOD 254, antenna 252, memory 282, or the like) a report associated with the set of measurements of the wideband signal; and/or means for communicating (e.g., using antenna 252, DEMOD 254, MIMO detector 256, receive processor 258, transmit processor 264, TX MIMO processor 266, MOD 254, controller/processor 280, memory 282, or the like) using a second beam that has a beam direction determined based at least in part on the report associated with the set of measurements of the wideband signal. In some aspects, the means for the receiver device to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
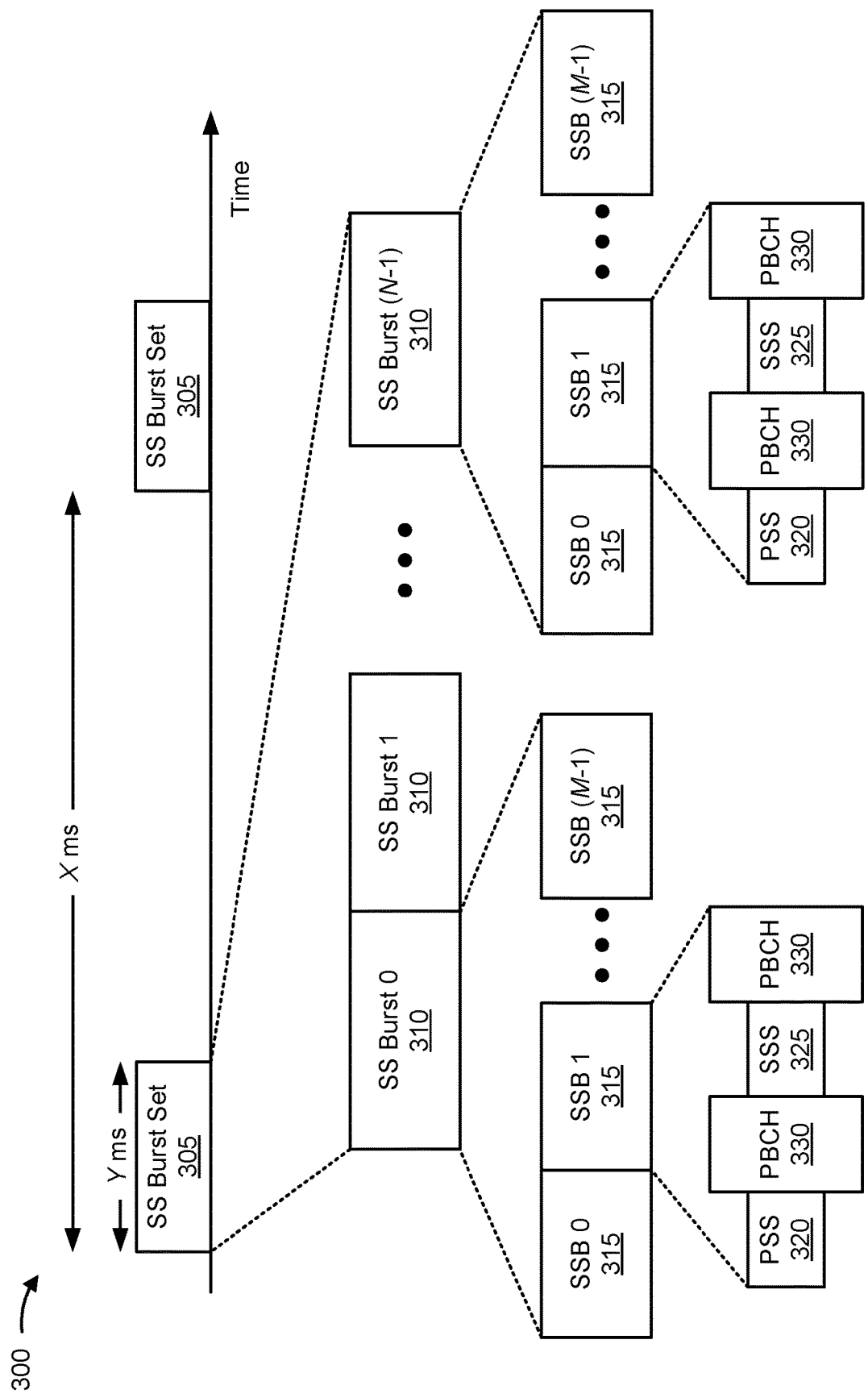
FIG. 3 is a diagram illustrating an example of synchronization signal (SS) hierarchy, in accordance with the present disclosure.

FIG. 3 is a diagram illustrating an example 300 of a synchronization signal (SS) hierarchy, in accordance with the present disclosure. As shown in FIG. 3, the SS hierarchy may include an SS burst set 305, which may include multiple SS bursts 310, shown as SS burst 0 through SS burst N−1, where N is a maximum number of repetitions of the SS burst 310 that may be transmitted by the base station. As further shown, each SS burst 310 may include one or more SS blocks (SSBs) 315, shown as SSB 0 through SSB M−1, where M is a maximum number of SSBs 315 that can be carried by an SS burst 310. In some aspects, different SSBs 315 may be beamformed differently (e.g., transmitted using different beams) and may be used for cell search, cell acquisition, beam management, and/or beam selection (e.g., as part of an initial network access procedure). An SS burst set 305 may be periodically transmitted by a wireless node (e.g., BS 110), such as every X milliseconds (ms), as shown in FIG. 3. In some aspects, an SS burst set 305 may have a fixed or dynamic length, shown as Y ms in FIG. 3. In some cases, an SS burst set 305 or an SS burst 310 may be referred to as a discovery reference signal (DRS) transmission window or an SSB measurement time configuration (SMTC) window.

In some aspects, an SSB 315 may include resources that carry a primary synchronization signal (PSS) 320, a secondary synchronization signal (SSS) 325, and/or a physical broadcast channel (PBCH) 330. In some aspects, multiple SSBs 315 are included in an SS burst 310 (e.g., with transmission on different beams), and the PSS 320, the SSS 325, and/or the PBCH 330 may be the same across each SSB 315 of the SS burst 310. In some aspects, a single SSB 315 may be included in an SS burst 310. In some aspects, the SSB 315 may be at least four symbols (e.g., orthogonal frequency division multiplexing (OFDM) symbols) in length, where each symbol carries one or more of the PSS 320 (e.g., occupying one symbol), the SSS 325 (e.g., occupying one symbol), and/or the PBCH 330 (e.g., occupying two symbols). In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

In some aspects, the SS bursts 310 may have a burst period, and the SSBs 315 of the SS burst 310 may be transmitted by a wireless node (e.g., a BS 110) according to the burst period. In this case, the SSBs 315 may be repeated during each SS burst 310. In some aspects, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some aspects, an SSB 315 may include an SSB index, which may correspond to a beam used to carry the SSB 315. A UE may monitor for and/or measure SSBs 315 using different receive (Rx) beams during an initial network access procedure and/or a cell search procedure, among other examples. Based at least in part on the monitoring and/or measuring, the UE may indicate one or more SSBs 315 with a best signal parameter (e.g., a reference signal received power (RSRP) parameter) to a BS. The BS and the UE may use the one or more indicated SSBs 315 to select one or more beams to be used for communication between the BS and the UE (e.g., for a random access channel (RACH) procedure). Additionally, or alternatively, the UE may use the SSB 315 and/or the SSB index to determine a cell timing for a cell via which the SSB 315 is received (e.g., a serving cell).

In some aspects, a wireless node (e.g., a BS) may use a true-time-delay array architecture for frequency division multiplexing (FDM)-based beam sweeping associated with transmission of an SSB 315 rather than time division multiplexing (TDM)-based beam sweeping. When using a true-time-delay architecture, the wireless node may transmit the M repetitions of an SSB 315 in different frequency subbands via a true-time-delay array. For example, the wireless node may transmit different repetitions of an SSB 315 in different directions and using different, discrete, frequency division multiplexed reference signals. A UE may measure one or more of the different, discrete, frequency division multiplexed reference signals to enable beam management procedures.

As indicated above, FIG. 3 is provided as an example. Other examples may differ from what is described with regard to FIG. 3.

Figure 4:
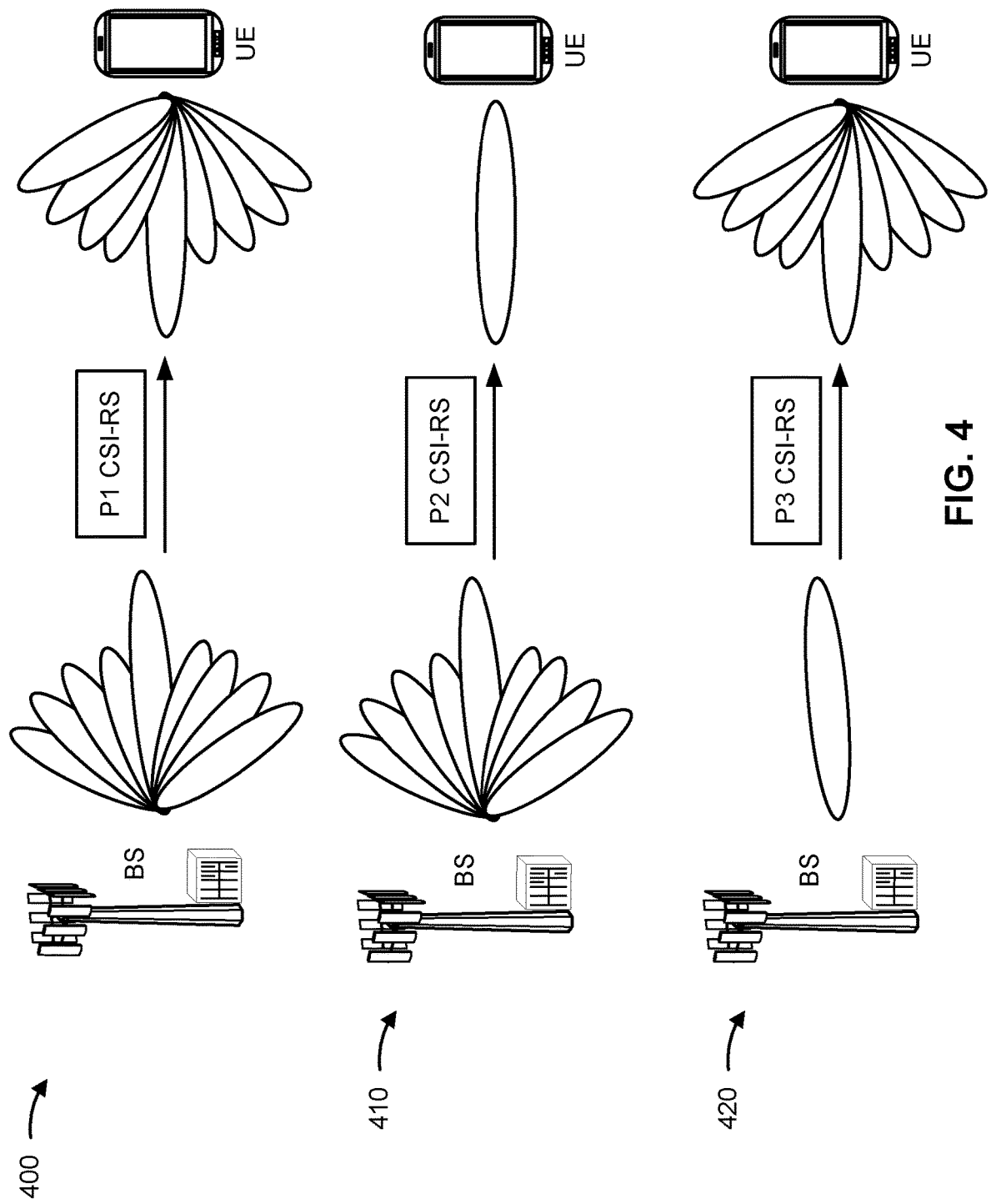
FIG. 4 is a diagram illustrating an example of channel state information (CSI) reference signal (RS) (CSI-RS) beam management procedures, in accordance with the present disclosure.

FIG. 4 is a diagram illustrating examples 400, 410, and 420 of channel state information (CSI) reference signal (RS) (CSI-RS) beam management procedures, in accordance with the present disclosure. As shown in FIG. 4, examples 400, 410, and 420 include a UE in communication with a BS in a wireless network. However, the devices shown in FIG. 4 are provided as examples, and the wireless network may support communication and beam management between other devices (e.g., between a UE and a BS or transmit receive point (TRP), between a mobile termination node and a control node, between an integrated access and backhaul (IAB) child node and an IAB parent node, and/or between a scheduled node and a scheduling node). In some aspects, the UE and the BS may be in a connected state (e.g., a radio resource control (RRC) connected state).

As shown in FIG. 4, example 400 may include a BS and a UE communicating to perform beam management using CSI-RSs. Example 400 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 4 and example 400, CSI-RSs may be configured to be transmitted from the BS to the UE. The CSI-RSs may be configured to be periodic (e.g., using RRC signaling), semi-persistent (e.g., using media access control (MAC) control element (MAC-CE) signaling), and/or aperiodic (e.g., using downlink control information (DCI)).

The first beam management procedure may include the BS performing beam sweeping over multiple, discrete transmit (Tx) beams. The BS may transmit a CSI-RS using each transmit beam for beam management. To enable the UE to perform receive (Rx) beam sweeping, the BS may use a transmit beam to transmit (e.g., with repetitions) each CSI-RS at multiple times within the same RS resource set so that the UE can sweep through receive beams in multiple transmission instances. For example, if the BS has a set of K transmit beams and the UE has a set of L receive beams, the CSI-RS may be transmitted on each of the K transmit beams L times so that the UE may receive L instances of the CSI-RS per transmit beam. In other words, for each transmit beam of the BS, the UE may perform beam sweeping through the receive beams of the UE. As a result, the first beam management procedure may enable the UE to measure a CSI-RS on different transmit beams using different receive beams to support selection of BS transmit beams/UE receive beam(s) beam pair(s). The UE may report the measurements to the BS to enable the BS to select one or more beam pair(s) for communication between the BS and the UE. While example 400 has been described in connection with CSI-RSs, the first beam management process may also use SSBs for beam management in a similar manner as described above. For example, as described above, a BS may transmit an SSB to a UE to enable determination of a beam pair for communication.

As shown in FIG. 4, example 410 may include a BS and a UE communicating to perform beam management using CSI-RSs. Example 410 depicts a second beam management procedure (e.g., P2 CSI-RS beam management). The second beam management procedure may be referred to as a "beam refinement procedure", a "base station beam refinement procedure", a "TRP beam refinement procedure", and/or a "transmit beam refinement procedure". As shown in FIG. 4 and example 410, CSI-RSs may be configured to be transmitted from the BS to the UE. The CSI-RSs may be configured to be aperiodic (e.g., using downlink control information (DCI)). The second beam management procedure may include the BS performing beam sweeping over one or more transmit beams. The one or more transmit beams may be a subset of all transmit beams associated with the BS (e.g., determined based at least in part on measurements reported by the UE in connection with the first beam management procedure). The BS may transmit a CSI-RS using each transmit beam of the one or more transmit beams for beam management. The UE may measure each CSI-RS using a single (e.g., a same) receive beam (e.g., determined based at least in part on measurements performed in connection with the first beam management procedure). The second beam management procedure may enable the BS to select a best transmit beam based at least in part on measurements of the CSI-RSs (e.g., measured by the UE using the single receive beam) reported by the UE.

As shown in FIG. 4, example 420 depicts a third beam management procedure (e.g., P3 CSI-RS beam management). The third beam management procedure may be referred to as a "beam refinement procedure", a "UE beam refinement procedure", and/or a "receive beam refinement procedure". As shown in FIG. 4 and example 420, one or more CSI-RSs may be configured to be transmitted from the BS to the UE. The CSI-RSs may be configured to be aperiodic (e.g., using DCI). The third beam management process may include the BS transmitting the one or more CSI-RSs using a single transmit beam (e.g., determined based at least in part on measurements reported by the UE in connection with the first beam management procedure and/or the second beam management procedure). To enable the UE to perform receive beam sweeping, the base station may use a transmit beam to transmit (e.g., with repetitions) CSI-RS at multiple times within the same RS resource set so that the UE can sweep through one or more receive beams in multiple transmission instances. The one or more receive beams may be a subset of all receive beams associated with the UE (e.g., determined based at least in part on measurements performed in connection with the first beam management procedure and/or the second beam management procedure). The third beam management procedure may enable the BS and/or the UE to select a best receive beam based at least in part on the reported measurements received from the UE (e.g., of the CSI-RS of the transmit beam using the one or more receive beams).

As indicated above, FIG. 4 is provided as an example of beam management procedures. Other examples of beam management procedures may differ from what is described with respect to FIG. 4. For example, the UE and the BS may perform the third beam management procedure before performing the second beam management procedure, and/or the UE and the BS may perform a similar beam management procedure to select a UE transmit beam.

In an analog beamforming array, a transmitter device, such as a BS 110, transmits a signal from array elements using different beamforming weights $w_i$. When a transmitted signal is not frequency selective in a wireless channel (e.g., a bandwidth of a transmission waveform is approximately the same as a coherent bandwidth of the wireless channel), a receiver device, such as a UE 120, receives a signal that is frequency flat (e.g., each frequency component of the transmission waveform experiences approximately the same behavior with respect to, for example, fading).

However, in a true-time-delay array, which may also be referred to as a "true-time-delay analog array", a "true-time-delay architecture", or a "true-time-delay analog array architecture", among other examples, the transmitter device applies a set of different time delays, in addition to the different beamforming weights, to repetitions of the signal. For example, assume a wideband (e.g., spanning multiple tones) signal S that is to be transmitted by an array of antenna elements, where each antenna element i multiplies signal S by its respective beamforming weight, $W_i$ as mentioned above. In this true-time-delay architecture, each antenna element i would, in addition to multiplying signal S by its respective beamforming weight, apply a time delay, $d_i$. In one mathematical representation, each antenna element i would transmit signal $Y_i$, where signal $y_i$ (t)=$WI*S(t-d_i)$. A fixed time delay or time shift, $d_i$, across the antenna elements in time domain can result in a frequency dependent phase shift in the frequency domain. As such, the time delay, $d_i$, applied to each antenna element can be understood as a different frequency domain phase offset value being introduced to each tone of signal S. This phase offset can result in each tone being transmitted in a different direction. As such, when the transmitter device transmits using a true-time-delay array, the transmitter device transmits using beamforming that is frequency selective with respect to different transmit directions. While the signal S has been described above as being multiplied by beamforming weights, it is understood that such a multiplication in mathematical terms may be implemented in hardware in an antenna array, or circuitry associated with an antenna array, using different components such as phase shifters, power amplifiers, and/or the like.

Figure 5:
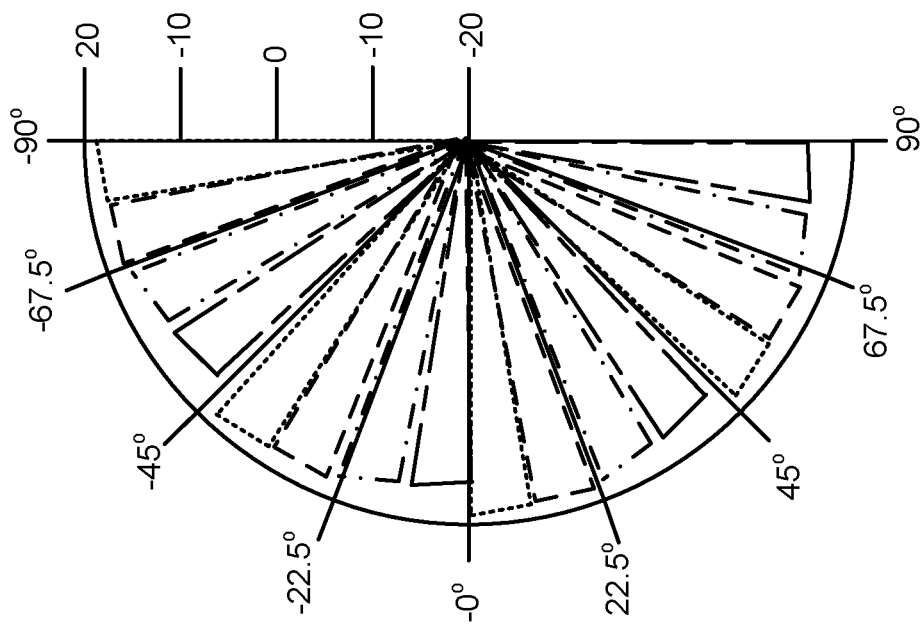
FIG. 5 is a diagram illustrating an example of true-time-delay beamforming, in accordance with the present disclosure.

FIG. 5 is a diagram illustrating an example 500 of true-time-delay beamforming, in accordance with the present disclosure.

As shown in FIG. 5, signals associated with different portions of a frequency are pointed in different directions. For example, a transmitter device may transmit a first sub-band of a frequency band in a first direction and a second sub-band of the frequency band in a second direction that is different than the first direction. In one example, each sub-band within the frequency band can correspond to a resource element, such that each resource element has a different frequency but is transmitted at a same time. In this way, a BS 110 may concurrently transmit a plurality of repetitions of a communication in different frequency sub-bands, which may correspond to the sub-bands of the frequency band that are covered by different signals transmittable using a true-time-delay array. Similarly, the BS 110 may receive signals from different directions concurrently from a plurality of UEs 120 using a true-time-delay array, which may be referred to as a "receive true-time-delay array" or an "Rx true-time-delay array", among other examples. In this case, a receive direction of a first communication may correspond to a transmit direction of a second communication that triggered the first communication. Further, sub-bands used for transmission may correspond to sub-bands used for reception so that the BS 110 transmits a repetition of a communication on a particular sub-band using the true-time-delay array and receives a response to the communication on the particular sub-band.

As indicated above, FIG. 5 is provided as an example. Other examples may differ from what is described with respect to FIG. 5.

As described above, to perform beam management and/or beam refinement procedures, a BS may transmit a plurality of discrete, frequency division multiplexed reference signals for measurement by a UE. The UE may report a result of one or more measurements to enable the BS to determine a beam direction, a transmit power, or a beam angle, among other examples. However, a granularity of such beam management and/or beam refinement procedures may be limited by a quantity of discrete reference signals that are transmitted.

Some aspects described herein enable a BS to use a true-time-delay analog array to transmit a wideband, frequency-selective beam across a plurality of different resource elements and directions such that each direction of the plurality of directions is associated with a different resource element of the plurality of resource elements where the plurality resource elements can be defined by a plurality of resource element (RE) offsets relative to a reference RE. In this case, the UE may perform measurements of the beam at the plurality of RE offsets and report a result of the measurements to the BS or a control node to enable a beam management and/or beam refinement procedure. Based at least in part on using measurements of different RE offsets of a wideband, frequency-selective beam rather than measurements of a plurality of discrete frequency division multiplexed reference signals, the BS may achieve a finer level of beam management and/or beam refinement. Based at least in part on achieving a finer level of beam management and/or beam refinement, the BS and the UE may reduce a likelihood of interference, improve a channel quality, reduce communication overhead, or improve network performance, among other examples.

Figure 6A:
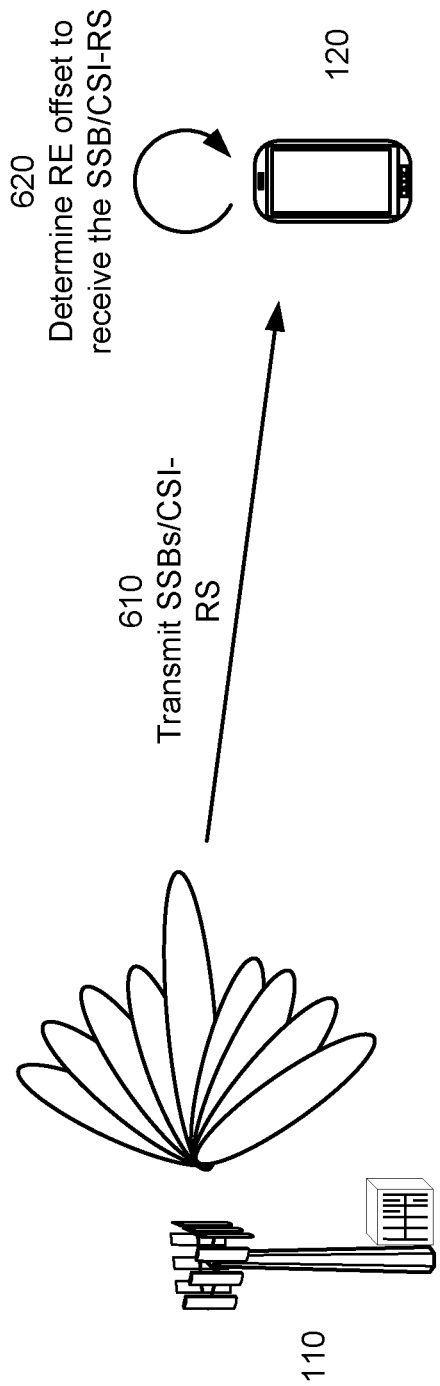
FIGS. 6A-6B are diagrams illustrating examples associated with beam refinement and localization using true-time-delay analog arrays, in accordance with the present disclosure.
Figure 6B:
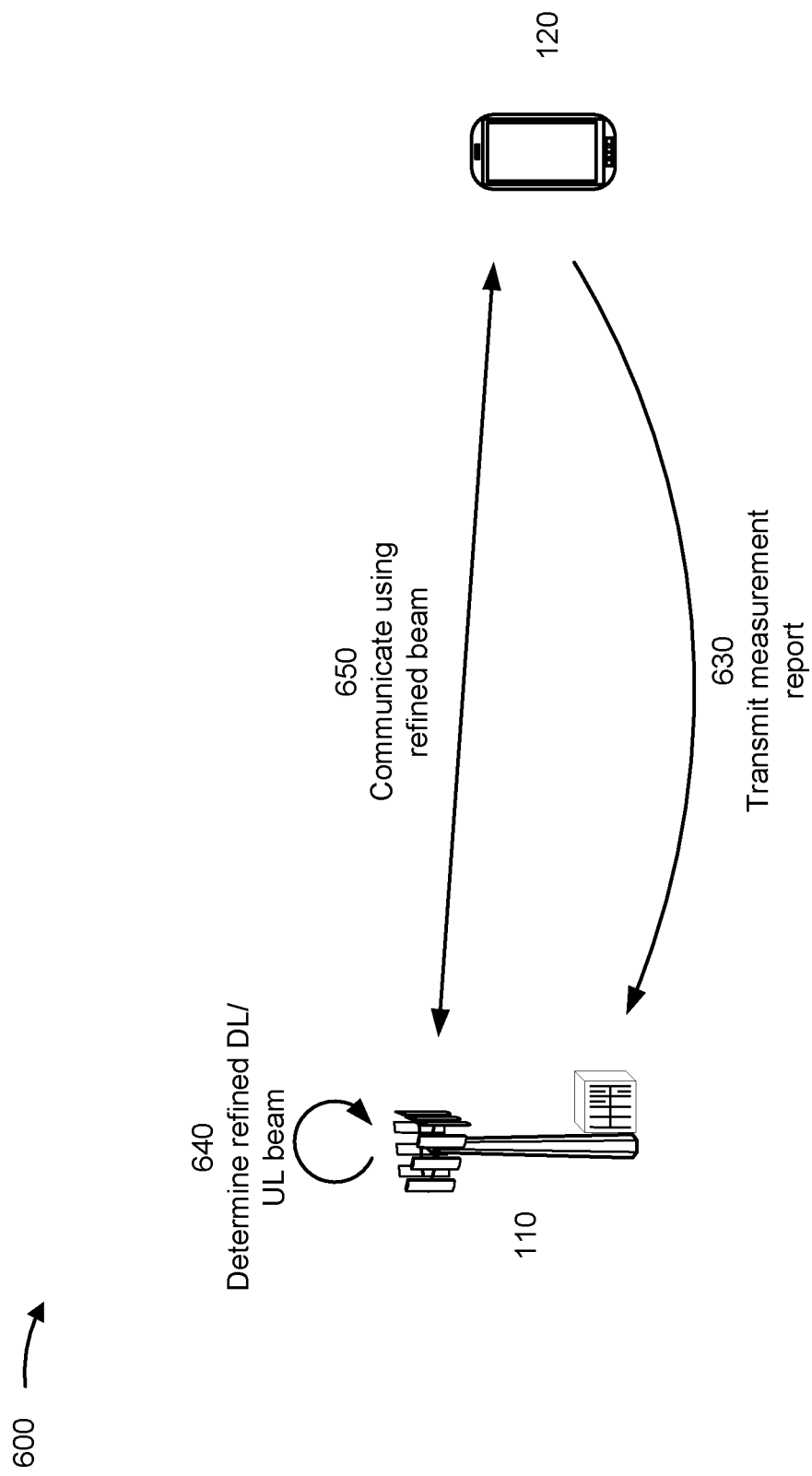

FIGS. 6A and 6B are diagrams illustrating an example 600 associated with beam refinement and localization using true-time-delay analog arrays, in accordance with the present disclosure. As shown in FIGS. 6A and 6B, example 600 includes communication between a BS 110 and a UE 120. In some aspects, BS 110 and UE 120 may be included in a wireless network, such as wireless network 100. BS 110 and UE 120 may communicate via a wireless access link, which may include an uplink and a downlink.

As further shown in FIG. 6A, and by reference number 610, BS 110 may transmit a beam to UE 120. For example, BS 110 may transmit an SSB or a CSI-RS. In some aspects, BS 110 may transmit a wideband signal. For example, BS 110 may repeat a sequence or signal in a frequency domain using a frequency-domain beam sweeping configuration (e.g., using a true-time-delay analog beamforming array). In some aspects, BS 110 may transmit a particular quantity of repetitions of a communication via the wideband signal. For example, BS 110 may transmit a particular quantity of repetitions of an SSB or CSI-RS in a frequency domain using a true-time-delay analog beamforming array.

As further shown in FIG. 6A, and by reference number 620, UE 120 may determine a set of RE offsets to receive the beam from BS 110. For example, UE 120 may monitor the set of RE offsets and receive an SSB or CSI-RS at the set of RE offsets. In some aspects, UE 120 may receive the beam using a set of frequency offset hypotheses. For example, UE 120 may receive and process a wideband signal using a set of K frequency offset hypotheses and may determine a set of K measurements. In this case, the set of K measurements may include a signal power measurement or a signal strength measurement, among other examples. Based at least in part on the set of measurements, UE 120 may determine a best RE offset at which to receive the SSB or CSI-RS (e.g., an RE offset with a greatest signal strength). In this case, based at least in part on BS 110 transmitting repetitions of an SSB or CSI-RS in a frequency domain, UE 120 may achieve a more accurate determination of an angle of departure (AoD) value than is achieved if BS 110 transmits the repetitions of the SSB or CSI-RS in the time domain as in other techniques.

In some aspects, UE 120 may select the frequency offset hypotheses based at least in part on received signaling. For example, UE 120 may receive information from BS 110 or a control node indicating the frequency offset hypotheses to select. In this case, the frequency offset hypotheses may be selected on a per-RE basis, a per-resource block (RB) basis, or a per grouping basis (e.g., for groups of REs or groups of RBs), among other examples.

In some aspects, UE 120 may use true-time-delay analog beamforming to receive the wideband signal from BS 110. For example, UE 120 may use a true-time-delay analog beamforming array to receive the wideband signal and determine a receive beam direction or angle of arrival (AoA), among other examples, based at least in part on a set of measurements of the wideband signal. In this case, when UE 120 transmits a measurement report, UE 120 may transmit information identifying a selected receive beam direction or AoA.

In some aspects, UE 120 may process a received signal to correlate the received signal with a reference signal. For example, UE 120 may descramble a received frequency-domain signal in accordance with an equation:

$$Y(n) = R(n) * \frac{conj(S(n))}{abs(S(n))^2} = h(n) + w'(n), \text{ for all } n \in \{1, \ldots, N\}$$

where S(n)+w(n) represents the received signal over tones n∈{1, ..., N}, h(n) represents a channel on which the signal is received, S(n) represents the transmitted signal, and w(n) represents additive noise associated with an nth tone (e.g., K hypotheses may correspond to $n_i$ to $n_k$ tones). In this case, for each frequency hypothesis $N_k$, UE 120 may determine:

$$P_{n_k} := \sum_{n=n_k-L}^{n_k+H-1} Y(n)$$

where P is a measured power and L and H are a correlation interval selected so that L+H consecutive tones are within a coherence bandwidth indicating approximately the same transmission direction (and values of L and H are selected by UE 120 or indicated to UE 120). Alternatively, Y(n) may be circularly correlated with a reference signal X=(1, ..., 1, 0, ..., 0), which has L+H ones and N−L−H zeroes. In this case, UE 120 may implement the circular correlation using time domain multiplication, such as using a fast Fourier transform and/or inverse fast Fourier transform (IFFT) procedure.

As further shown in FIG. 6B, and by reference number 630, UE 120 may transmit a measurement report to BS 110. For example, UE 120 may transmit the measurement report (e.g., via a configured beam report message or via a random access channel (RACH) message) to provide information associated with one or more measurements of the beam. In some aspects, BS 110 may receive a measurement report including all measurements that UE 120 performed. Additionally, or alternatively, BS 110 may receive a measurement report including a subset of measurements (e.g., measurements representing a set of strongest signal strengths, weakest signal strengths, or signal strengths satisfying a configured threshold) and corresponding indices (e.g., indices of frequency hypotheses at which reported measurements were performed). In some aspects, BS 110 may receive a measurement report including indices but not measurements. For example, BS 110 may receive a measurement report that includes a set of indices representing a set of frequency offset values, and BS 110 may determine that measurements for the set of frequency offset values satisfy a threshold based at least in part on the corresponding set of indices being included in the measurement report.

In some aspects, BS 110 may receive a measurement report identifying a set of AoA or AoD values. For example, when BS 110 is configured with information mapping frequency hypotheses to angular values, BS 110 may receive a measurement report identifying angular values and may derive frequency hypotheses based at least in part on the mapping. In this case, the mapping may include configured or indicated information identifying a coverage region (e.g., a minimum angle or a maximum angle) for a frequency hypothesis performed on the wideband signal. Based at least in part on UE 120 achieving a more accurate AoD determination, for example, BS 110 may point a downlink or uplink beam with a higher level of accuracy for subsequent communications with the UE 120.

In some aspects, BS 110 may receive a measurement report including explicit indicators. For example, BS 110 may receive a measurement report that includes information explicitly indicating values of, for example, measurements in a payload of a message or via an identifier used to generate a sequence for the message. Additionally, or alternatively, BS 110 may receive a measurement report that includes implicit indicators. For example, UE 120 may transmit a measurement report with a configuration selected based at least in part on a determined hypothesis. In this case, a frequency-domain location, time-domain location, or beam direction of the measurement report may correspond to a hypothesis, thereby enabling BS 110 to derive the hypothesis that is a subject of the measurement report.

In some aspects, UE 120 may transmit the measurement report to a control node. For example, UE 120 may transmit the measurement report to a control node associated with a wireless network that includes UE 120 and BS 110. In this case, the control node may forward the measurement report to BS 110 or may determine a communication configuration (e.g., information identifying a refined beam, such as an AoA value or an AoD value) and transmit information identifying the communication configuration to BS 110 and/or UE 120.

As further shown in FIG. 6B, and by reference number 640, BS 110 may determine a refined downlink or uplink beam. For example, BS 110 may determine the refined downlink or uplink beam based at least in part on the measurement report. In some aspects, BS 110 may determine a transmit beam direction or AoD based at least in part on the measurement report. For example, based at least in part on the measurement report identifying a frequency offset hypothesis with a strongest signal strength, BS 110 may determine a transmit beam direction or AoD for a subsequent transmission to achieve a stronger signal strength than using other possible transmit beam directions or AoDs. Additionally, or alternatively, BS 110 may determine a receive beam direction or AoA that UE 120 is to use to receive a subsequent transmission. In this case, BS 110 may transmit information indicating or confirming the receive beam direction or AoA that UE 120 is to use and/or may configure a transmit beam based at least in part on the receive beam direction or AoA.

In some aspects, BS 110 may determine a refined beam based at least in part on quasi co-location (QCL) information. For example, BS 110 may receive, from a control node, information indicating that BS 110 is to configure a first beam to be quasi co-located with a second beam for which a hypothesis, AoA, or AoD was reported by UE 120. Additionally, or alternatively, BS 110 may receive, from a control node, information indicating that a reported AoA or AoD is to be used for positioning, beam selection, interference management, or mobility management, among other examples. In this case, BS 110 may perform a procedure to mitigate interference, enable mobility, or select a beam, among other examples, based at least in part on the information from the control node.

As further shown in FIG. 6B, and by reference number 650, BS 110 and UE 120 may communicate using the refined beam. For example, UE 120 and BS 110 may communicate on a downlink using a refined downlink beam or on an uplink using a refined uplink beam.

As indicated above, FIGS. 6A and 6B are provided as one or more examples. Other examples may differ from what is described with respect to FIGS. 6A and 6B.

Figure 7:
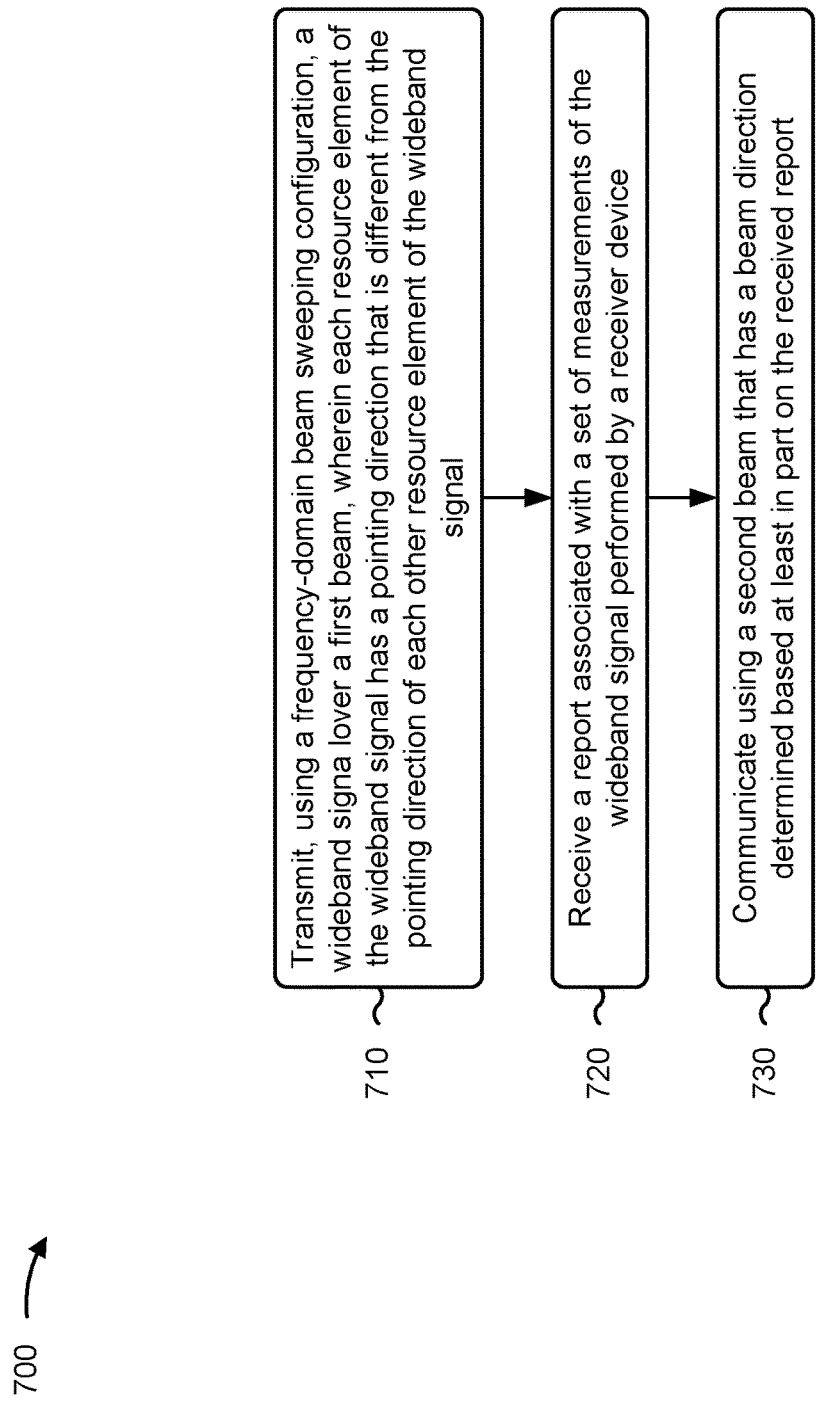
FIGS. 7-8 are diagrams illustrating example processes associated with beam refinement and localization using true-time-delay analog arrays, in accordance with the present disclosure.

FIG. 7 is a diagram illustrating an example process 700 performed, for example, by a transmitter device, in accordance with the present disclosure. Example process 700 is an example where the transmitter device (e.g., BS 110) performs operations associated with beam refinement and localization using true-time-delay analog arrays.

As shown in FIG. 7, in some aspects, process 700 may include transmitting, using a frequency-domain beam sweeping configuration, a wideband signal over a first beam, wherein each resource element of the wideband signal has a pointing direction that is different from the pointing direction of each other resource element of the wideband signal (block 710). For example, the transmitter device (e.g., using transmission component 904, depicted in FIG. 9) may transmit, using a frequency-domain beam sweeping configuration, a wideband signal over a first beam, wherein each resource element of the wideband signal has a pointing direction that is different from the pointing direction of each other resource element of the wideband signal, as described above, for example, with reference to FIGS. 6A-6B. In some aspects, the wideband signal changes continuously in the frequency domain by changing without a discrete step size or with a discrete step size that is less than a threshold amount.

As further shown in FIG. 7, in some aspects, process 700 may include receiving a report associated with a set of measurements of the wideband signal performed by a receiver device (block 720). For example, the transmitter device (e.g., using reception component 902, depicted in FIG. 9) may receive a report associated with a set of measurements of the wideband signal performed by a receiver device, as described above, for example, with reference to FIGS. 6A-6B.

As further shown in FIG. 7, in some aspects, process 700 may include communicating using a second beam that has a beam direction determined based at least in part on the received report (block 730). For example, the transmitter device (e.g., using reception component 902 and/or transmission component 904, depicted in FIG. 9) may communicate using a second beam that has a beam direction determined based at least in part on the received report, as described above, for example, with reference to FIGS. 6A-6B.

Process 700 may include additional aspects, such as any single aspect or any combination of aspects described below and/or in connection with one or more other processes described elsewhere herein.

In a first aspect, the first beam is associated with a first bandwidth and the second beam is associated with a second bandwidth that is narrower than the first bandwidth.

In a second aspect, alone or in combination with the first aspect, the second beam is associated with another wideband signal, and communicating using the second beam comprises communicating using an analog or digital beamforming configuration for the second beam.

In a third aspect, alone or in combination with one or more of the first and second aspects, the second beam is determined based at least in part on a set of power or strength metrics related to a set of frequency offset hypotheses.

In a fourth aspect, alone or in combination with one or more of the first through third aspects, a transmit beam direction, a receive beam direction, an AoA, an AoD, or a combination thereof for the second beam is determined based at least in part on the wideband signal.

In a fifth aspect, alone or in combination with one or more of the first through fourth aspects, the wideband signal comprises a sequence or signal that is repeated in the frequency domain.

In a sixth aspect, alone or in combination with one or more of the first through fifth aspects, process 700 includes transmitting information configuring selection of a set of frequency offset hypotheses for receiving the wideband signal, wherein the set of frequency offset hypotheses are configured for a group of the resource elements, a group of resource blocks, or a combination thereof.

In a seventh aspect, alone or in combination with one or more of the first through sixth aspects, the report includes information identifying all of the set of measurements, a subset of the set of measurements, a set of frequency offset values, a set of AoA values, a set of AoD values, or a combination thereof.

In an eighth aspect, alone or in combination with one or more of the first through seventh aspects, the report includes an explicit indicator of the information or an identifier associated with a sequence relating to the information.

In a ninth aspect, alone or in combination with one or more of the first through eighth aspects, the report is conveyed via a third signal whose configuration corresponds to the information.

In a tenth aspect, alone or in combination with one or more of the first through ninth aspects, process 700 includes receiving, from a control node, information identifying the second beam.

In an eleventh aspect, alone or in combination with one or more of the first through tenth aspects, the information identifying the second beam includes quasi co-location information, positioning information, beaming selection information, interference management information, mobility management information, or a combination thereof.

In a twelfth aspect, alone or in combination with one or more of the first through eleventh aspects, the second beam is determined based at least in part on a correlation between a reference signal and a hypothesis associated with the wideband signal.

In a thirteenth aspect, alone or in combination with one or more of the first through twelfth aspects, the wideband signal includes a set of repetitions of a synchronization signal block (SSB) or a channel state information reference signal (CSI-RS).

In a fourteenth aspect, alone or in combination with one or more of the first through thirteenth aspects, the second beam is determined based at least in part on a determined best resource element offset for receiving a repetition of an SSB or CSI-RS of the set of repetitions of the SSB or CSI-RS.

In a fifteenth aspect, alone or in combination with one or more of the first through fourteenth aspects, the second beam is determined based at least in part on a random access channel (RACH) report or beam report of a measurement of the set of repetitions of the SSB or CSI-RS.

In a sixteenth aspect, alone or in combination with one or more of the first through fifteenth aspects, a pointing direction of the second beam is based at least in part on the RACH report or the beam report.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
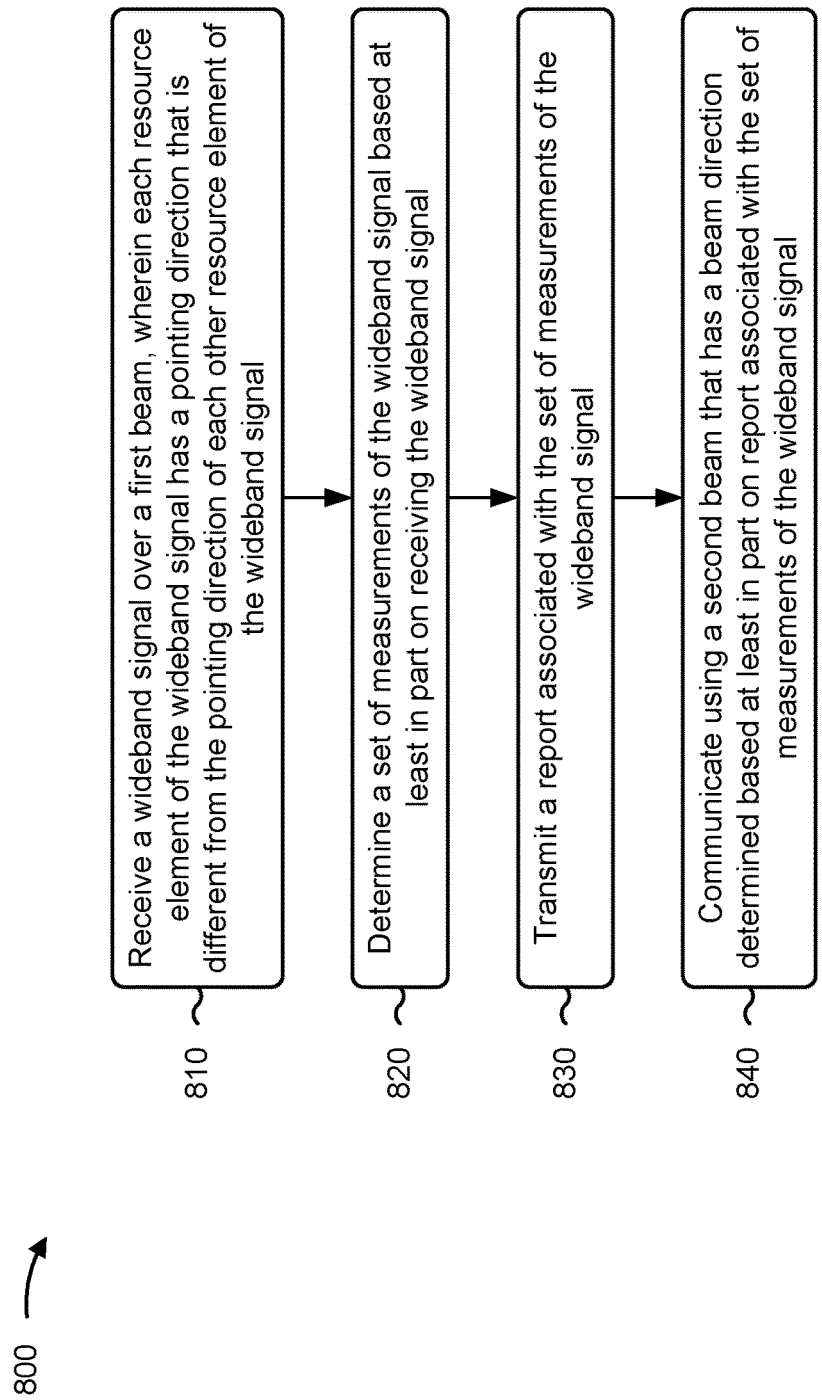

FIG. 8 is a diagram illustrating an example process 800 performed, for example, by a receiver device, in accordance with the present disclosure. Example process 800 is an example where the receiver device (e.g., UE 120) performs operations associated with beam refinement and localization using true-time-delay analog arrays.

As shown in FIG. 8, in some aspects, process 800 may include receiving a wideband signal over a first beam, wherein each resource element of the wideband signal has a pointing direction that is different from the pointing direction of each other resource element of the wideband signal (block 810). For example, the receiver device (e.g., using reception component 1002, depicted in FIG. 10) may receive a wideband signal over a first beam, wherein each resource element of the wideband signal has a pointing direction that is different from the pointing direction of each other resource element of the wideband signal, as described above, for example, with reference to FIGS. 6A-6B.

As further shown in FIG. 8, in some aspects, process 800 may include determining a set of measurements of the wideband signal based at least in part on receiving the wideband signal (block 820). For example, the receiver device (e.g., using determination component 1008, depicted in FIG. 10) may determine a set of measurements of the wideband signal based at least in part on receiving the wideband signal, as described above, for example, with reference to FIGS. 6A-6B.

As further shown in FIG. 8, in some aspects, process 800 may include transmitting a report associated with the set of measurements of the wideband signal (block 830). For example, the receiver device (e.g., using transmission component 1004, depicted in FIG. 10) may transmit a report associated with the set of measurements of the wideband signal, as described above, for example, with reference to FIGS. 6A-6B.

As further shown in FIG. 8, in some aspects, process 800 may include communicating using a second beam that has a beam direction determined based at least in part on the report associated with the set of measurements of the wideband signal (block 840). For example, the receiver device (e.g., using reception component 1002 and/or transmission component 1004, depicted in FIG. 10) may communicate using a second beam that has a beam direction determined based at least in part on the report associated with the set of measurements of the wideband signal, as described above, for example, with reference to FIGS. 6A-6B.

Process 800 may include additional aspects, such as any single aspect or any combination of aspects described below and/or in connection with one or more other processes described elsewhere herein.

In a first aspect, the first beam is associated with a first bandwidth and the second beam is associated with a second bandwidth that is narrower than the first bandwidth.

In a second aspect, alone or in combination with the first aspect, the second beam is associated with another wideband signal, and communicating using the second beam comprises communicating using an analog or digital beamforming configuration for the second beam.

In a third aspect, alone or in combination with one or more of the first and second aspects, receiving the wideband signal comprises receiving the wideband signal using a frequency domain beam sweeping technique, a set of frequency hypotheses, or a combination thereof.

In a fourth aspect, alone or in combination with one or more of the first through third aspects, the second beam is determined based at least in part on a set of power or strength metrics related to a set of frequency offset hypotheses.

In a fifth aspect, alone or in combination with one or more of the first through fourth aspects, a transmit beam direction, a receive beam direction, an AoA, an AoD, or a combination thereof for the second beam is determined based at least in part on the wideband signal.

In a sixth aspect, alone or in combination with one or more of the first through fifth aspects, the wideband signal comprises a sequence or signal that is repeated in the frequency domain.

In a seventh aspect, alone or in combination with one or more of the first through sixth aspects, process 800 includes receiving information configuring selection of a set of frequency offset hypotheses for receiving the wideband signal, wherein the set of frequency offset hypotheses are configured for a group of the resource elements, a group of resource blocks, or a combination thereof.

In an eighth aspect, alone or in combination with one or more of the first through seventh aspects, the report includes information identifying all of the set of measurements, a subset of the set of measurements, a set of frequency offset values, a set of AoA values, a set of AoD values, or a combination thereof.

In a ninth aspect, alone or in combination with one or more of the first through eighth aspects, the report includes an explicit indicator of the information or an identifier associated with a sequence relating to the information.

In a tenth aspect, alone or in combination with one or more of the first through ninth aspects, the report is conveyed via a third signal whose configuration corresponds to the information.

In an eleventh aspect, alone or in combination with one or more of the first through tenth aspects, process 800 includes receiving, from a control node or a transmitter node that transmitted the wideband signal, information identifying the second beam.

In a twelfth aspect, alone or in combination with one or more of the first through eleventh aspects, the information identifying the second beam includes quasi co-location information, positioning information, beaming selection information, interference management information, mobility management information, or a combination thereof.

In a thirteenth aspect, alone or in combination with one or more of the first through twelfth aspects, the second beam is determined based at least in part on a correlation between a reference signal and a hypothesis connected to the wideband signal.

In a fourteenth aspect, alone or in combination with one or more of the first through thirteenth aspects, the wideband signal includes a set of repetitions of an SSB or a CSI-RS.

In a fifteenth aspect, alone or in combination with one or more of the first through fourteenth aspects, the second beam is determined based at least in part on a determined best resource element offset for receiving a repetition of an SSB or CSI-RS of the set of repetitions of the SSB or CSI-RS.

In a sixteenth aspect, alone or in combination with one or more of the first through fifteenth aspects, the second beam is determined based at least in part on a RACH report or a beam report of a measurement of the set of repetitions of the SSB or CSI-RS.

In a seventeenth aspect, alone or in combination with one or more of the first through sixteenth aspects, the second beam is pointed based at least in part on the RACH report or beam report.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
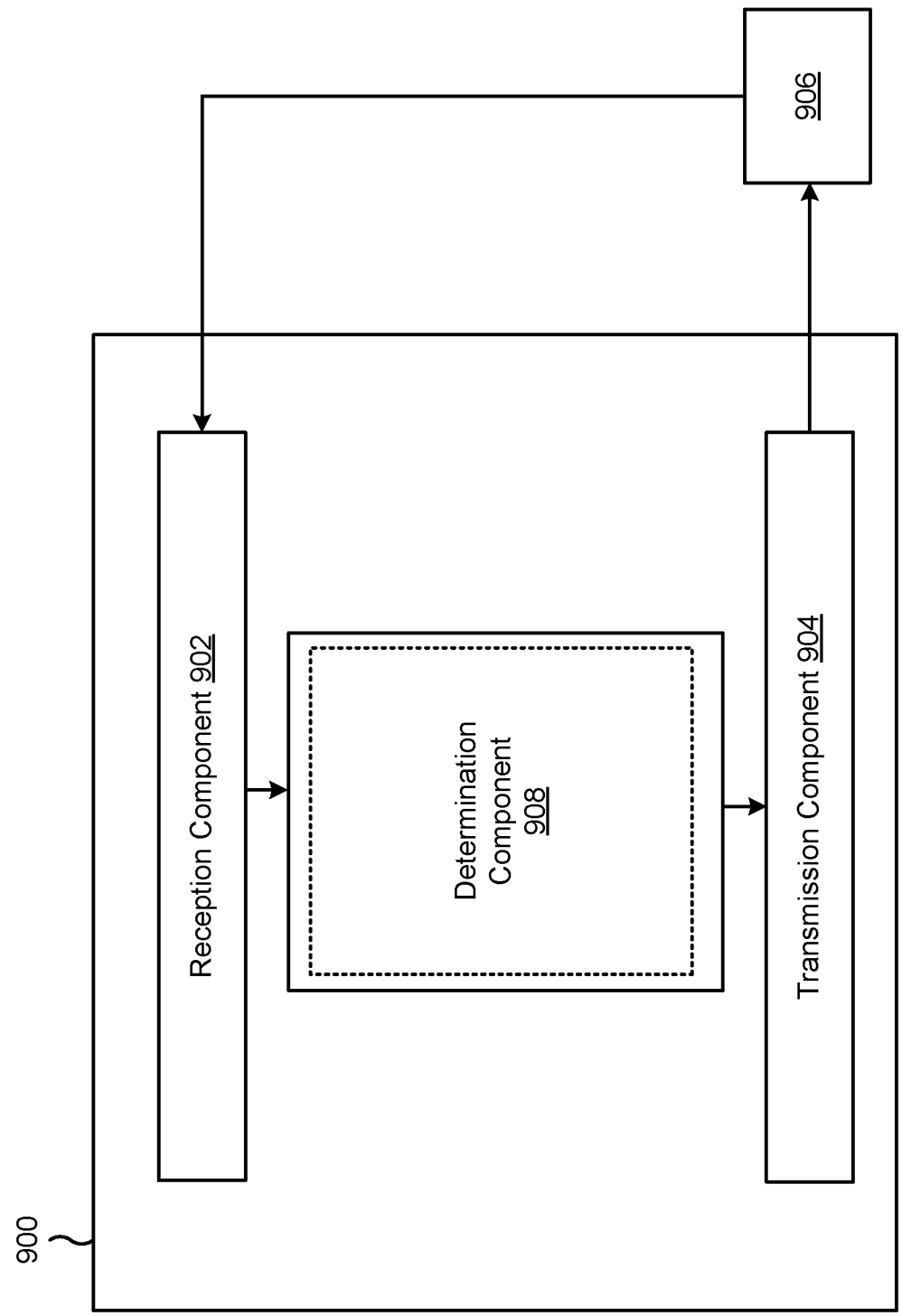
FIGS. 9-10 are block diagrams of example apparatuses for wireless communication, in accordance with the present disclosure.

FIG. 9 is a block diagram of an example apparatus 900 for wireless communication. The apparatus 900 may be a transmitter device, or a transmitter device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a receiver device, UE, a base station, or another wireless communication device) using the reception component 902 and the transmission component 904. As further shown, the apparatus 900 may include a determination component 908, among other examples.

In some aspects, the apparatus 900 may be configured to perform one or more operations described herein in connection with FIGS. 6A-6B. Additionally, or alternatively, the apparatus 900 may be configured to perform one or more processes described herein, such as process 700 of FIG. 7. In some aspects, the apparatus 900 and/or one or more components shown in FIG. 9 may include one or more components of the transmitter device described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the transmitter device described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the transmitter device described above in connection with FIG. 2. In some aspects, the transmission component 904 may be co-located with the reception component 902 in a transceiver.

The transmission component 904 may transmit, using a frequency-domain beam sweeping configuration, a wideband signal over a first beam, wherein each resource element of the wideband signal has a pointing direction that is different from the pointing direction of each other resource element of the wideband signal. The reception component 902 may receive a report associated with a set of measurements of the wideband signal performed by a receiver device. The reception component 902 and/or the transmission component 904 may communicate using a second beam that has a beam direction determined based at least in part on the received report.

The transmission component 904 may transmit information configuring selection of a set of frequency offset hypotheses for receiving the wideband signal, wherein the set of frequency offset hypotheses are configured for: a group of resource elements, a group of resource blocks, or a combination thereof. The reception component 902 may receive, from a control node, information identifying the second beam. The determination component 908 may determine a beam configuration based at least in part on a received report associated with a set of measurements.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
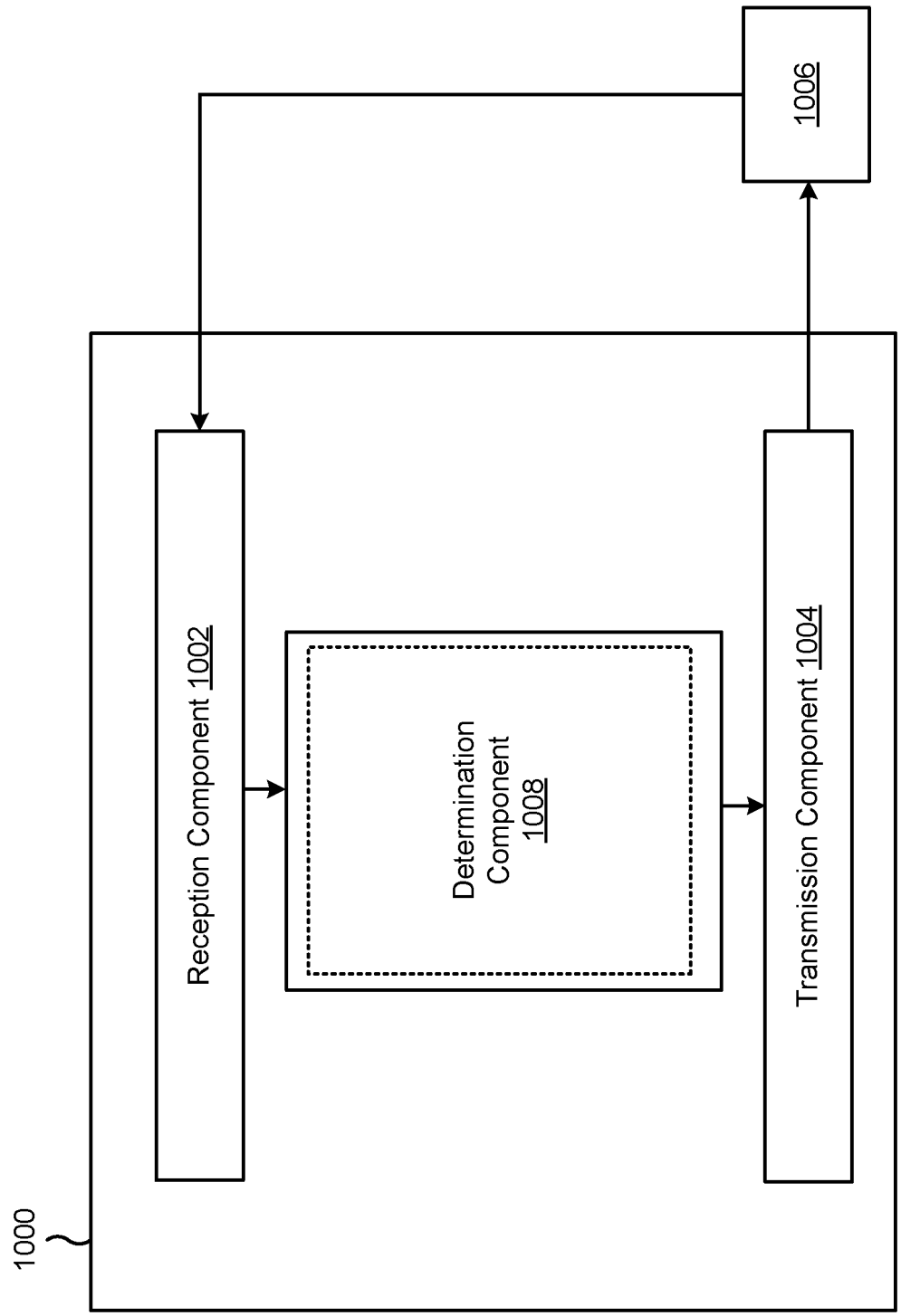

FIG. 10 is a block diagram of an example apparatus 1000 for wireless communication. The apparatus 1000 may be a receiver device, or a receiver device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a determination component 1008, among other examples.

In some aspects, the apparatus 1000 may be configured to perform one or more operations described herein in connection with FIGS. 6A-6B. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the receiver device described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the receiver device described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the receiver device described above in connection with FIG. 2. In some aspects, the transmission component 1004 may be co-located with the reception component 1002 in a transceiver.

The reception component 1002 may receive a wideband over a first beam, wherein each resource element of the wideband signal has a pointing direction that is different from the pointing direction of each other resource element of the wideband signal. The determination component 1008 may determine a set of measurements of the wideband signal based at least in part on receiving the wideband signal. The transmission component 1004 may transmit a report associated with the set of measurements of the wideband signal. The reception component 1002 and/or the transmission component 1004 may communicate using a second beam that has a beam direction determined based at least in part on the report associated with the set of measurements of the wideband signal.

The reception component 1002 may receive information configuring selection of a set of frequency offset hypotheses for receiving the wideband signal, wherein the set of frequency offset hypotheses are configured for: a group of resource elements, a group of resource blocks, or a combination thereof. The reception component 1002 may receive, from a control node or a transmitter node that transmitted the wideband signal, information identifying the second beam.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a transmitter device, comprising: transmitting, using a frequency-domain beam sweeping configuration, a wideband signal over a first beam, wherein each resource element of the wideband signal has a pointing direction that is different from the pointing direction of each other resource element of the wideband signal; receiving a report associated with a set of measurements of the wideband signal performed by a receiver device; and communicating using a second beam that has a beam direction determined based at least in part on the received report.

Aspect 2: The method of Aspect 1, wherein the first beam is associated with a first bandwidth and the second beam is associated with a second bandwidth that is narrower than the first bandwidth.

Aspect 3: The method of any of Aspects 1 to 2, wherein the second beam is associated with another wideband signal, and wherein communicating using the second beam comprises: communicating using an analog or digital beamforming configuration for the second beam.

Aspect 4: The method of any of Aspects 1 to 3, wherein the second beam is determined based at least in part on a set of power or strength metrics related to a set of frequency offset hypotheses.

Aspect 5: The method of any of Aspects 1 to 4, wherein a transmit beam direction, a receive beam direction, an angle of arrival (AoA), an angle of departure (AoD), or a combination thereof for the second beam is determined based at least in part on the wideband signal.

Aspect 6: The method of any of Aspects 1 to 5, wherein the wideband signal comprises a sequence or signal that is repeated in the frequency domain.

Aspect 7: The method of any of Aspects 1 to 6, further comprising: transmitting information configuring selection of a set of frequency offset hypotheses for receiving the wideband signal, wherein the set of frequency offset hypotheses are configured for: a group of the resource elements, a group of resource blocks, or a combination thereof.

Aspect 8: The method of any of Aspects 1 to 7, wherein the report includes information identifying: all of the set of measurements, a subset of the set of measurements, a set of frequency offset values, a set of angle of arrival (AoA) values, a set of angle of departure (AoD) values, or a combination thereof.

Aspect 9: The method of Aspect 8, wherein the report includes an explicit indicator of the information or an identifier associated with a sequence relating to the information.

Aspect 10: The method of any of Aspects 8 to 9, wherein the report is conveyed via a third signal whose configuration corresponds to the information.

Aspect 11: The method of any of Aspects 1 to 10, further comprising: receiving, from a control node, information identifying the second beam.

Aspect 12: The method of Aspect 11, wherein the information identifying the second beam includes: quasi co-location information, positioning information, beam selection information, interference management information, mobility management information, or a combination thereof.

Aspect 13: The method of any of Aspects 1 to 12, wherein the second beam is determined based at least in part on a correlation between a reference signal and a hypothesis associated with the wideband signal.

Aspect 14: The method of any of Aspects 1 to 13, wherein the wideband signal includes a set of repetitions of a synchronization signal block (SSB) or a channel state information reference signal (CSI-RS).

Aspect 15: The method of Aspect 14, wherein the second beam is determined based at least in part on a determined best resource element offset for receiving a repetition of an SSB or CSI-RS of the set of repetitions of the SSB or CSI-RS.

Aspect 16: The method of any of Aspects 14 to 15, wherein the second beam is determined based at least in part on a random access channel (RACH) report or beam report of a measurement of the set of repetitions of the SSB or CSI-RS.

Aspect 17: The method of Aspect 16, wherein a pointing direction of the second beam is based at least in part on the RACH report or beam report.

Aspect 18: A method of wireless communication performed by a receiver device, comprising: receiving a wideband signal over a first beam, wherein each resource element of the wideband signal has a pointing direction that is different from the pointing direction of each other resource element of the wideband signal; determining a set of measurements of the wideband signal based at least in part on receiving the wideband signal; transmitting a report associated with the set of measurements of the wideband signal; and communicating using a second beam that has a beam direction determined based at least in part on the report associated with the set of measurements of the wideband signal.

Aspect 19: The method of Aspect 18, wherein the first beam is associated with a first bandwidth and the second beam is associated with a second bandwidth that is narrower than the first bandwidth.

Aspect 20: The method of any of Aspects 18 to 19, wherein the second beam is associated with another wideband signal, and wherein communicating using the second beam comprises: communicating using an analog or digital beamforming configuration for the second beam.

Aspect 21: The method of any of Aspects 18 to 20, wherein receiving the wideband signal comprises: receiving the wideband signal using a frequency domain beam sweeping technique, a set of frequency hypotheses, or a combination thereof.

Aspect 22: The method of any of Aspects 18 to 21, wherein the second beam is determined based at least in part on a set of power or strength metrics related to a set of frequency offset hypotheses.

Aspect 23: The method of any of Aspects 18 to 22, wherein a transmit beam direction, a receive beam direction, an angle of arrival (AoA), an angle of departure (AoD), or a combination thereof for the second beam is determined based at least in part on the wideband signal.

Aspect 24: The method of any of Aspects 18 to 23, wherein the wideband signal comprises a sequence or signal that is repeated in the frequency domain.

Aspect 25: The method of any of Aspects 18 to 24, further comprising: receiving information configuring selection of a set of frequency offset hypotheses for receiving the wideband signal, wherein the set of frequency offset hypotheses are configured for: a group of the resource elements, a group of resource blocks, or a combination thereof.

Aspect 26: The method of any of Aspects 18 to 25, wherein the report includes information identifying: all of the set of measurements, a subset of the set of measurements, a set of frequency offset values, a set of angle of arrival (AoA) values, a set of angle of departure (AoD) values, or a combination thereof.

Aspect 27: The method of Aspect 26, wherein the report includes an explicit indicator of the information or an identifier associated with a sequence relating to the information.

Aspect 28: The method of any of Aspects 26 to 27, wherein the report is conveyed via a third signal whose configuration corresponds to the information.

Aspect 29: The method of any of Aspects 18 to 28, further comprising: receiving, from a control node or a transmitter node that transmitted the wideband signal, information identifying the second beam.

Aspect 30: The method of Aspect 29, wherein the information identifying the second beam includes: quasi co-location information, positioning information, beam selection information, interference management information, mobility management information, or a combination thereof.

Aspect 31: The method of any of Aspects 18 to 30, wherein the second beam is determined based at least in part on a correlation between a reference signal and a hypothesis connected to the wideband signal.

Aspect 32: The method of any of Aspects 18 to 31, wherein the wideband signal includes a set of repetitions of a synchronization signal block (SSB) or channel state information reference signal (CSI-RS).

Aspect 33: The method of Aspect 32, wherein the second beam is determined based at least in part on a determined best resource element offset for receiving a repetition of an SSB or CSI-RS of the set of repetitions of the SSB or CSI-RS.

Aspect 34: The method of any of Aspects 32 to 33, wherein the second beam is determined based at least in part on a random access channel (RACH) report or beam report of a measurement of the set of repetitions of the SSB or CSI-RS.

Aspect 35: The method of Aspect 33, wherein the second beam is pointed based at least in part on the RACH report or beam report.

Aspect 36: An apparatus for wireless communication at a device, comprising a processor; memory coupled with the processor; and instructions stored in the memory and executable by the processor to cause the apparatus to perform the method of one or more Aspects of Aspects 1-17.

Aspect 37: A device for wireless communication, comprising a memory and one or more processors coupled to the memory, the memory and the one or more processors configured to perform the method of one or more Aspects of Aspects 1-17.

Aspect 38: An apparatus for wireless communication, comprising at least one means for performing the method of one or more Aspects of Aspects 1-17.

Aspect 39: A non-transitory computer-readable medium storing code for wireless communication, the code comprising instructions executable by a processor to perform the method of one or more Aspects of Aspects 1-17.

Aspect 40: A non-transitory computer-readable medium storing a set of instructions for wireless communication, the set of instructions comprising one or more instructions that, when executed by one or more processors of a device, cause the device to perform the method of one or more Aspects of Aspects 1-17.

Aspect 41: An apparatus for wireless communication at a device, comprising a processor; memory coupled with the processor; and instructions stored in the memory and executable by the processor to cause the apparatus to perform the method of one or more Aspects of Aspects 18-35.

Aspect 42: A device for wireless communication, comprising a memory and one or more processors coupled to the memory, the memory and the one or more processors configured to perform the method of one or more Aspects of Aspects 18-35.

Aspect 43: An apparatus for wireless communication, comprising at least one means for performing the method of one or more Aspects of Aspects 18-35.

Aspect 44: A non-transitory computer-readable medium storing code for wireless communication, the code comprising instructions executable by a processor to perform the method of one or more Aspects of Aspects 18-35.

Aspect 45: A non-transitory computer-readable medium storing a set of instructions for wireless communication, the set of instructions comprising one or more instructions that, when executed by one or more processors of a device, cause the device to perform the method of one or more Aspects of Aspects 18-35.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmitter device for wireless communication, comprising:
   a memory; and
   one or more processors, coupled to the memory, configured to:
   transmit, using a frequency-domain beam sweeping configuration, a wideband signal over a first beam, wherein each resource element of the wideband signal has a pointing direction that is different from the pointing direction of each other resource element of the wideband signal;
   receive a report associated with a set of measurements of each resource element of the wideband signal performed by a receiver device; and
   communicate using a second beam that has a beam direction determined based at least in part on the received report.

2. The transmitter device of claim 1, wherein the first beam is associated with a first bandwidth and the second beam is associated with a second bandwidth that is narrower than the first bandwidth.

3. The transmitter device of claim 1, wherein the second beam is associated with another wideband signal, and wherein communicating using the second beam comprises:
communicate using an analog or digital beamforming configuration for the second beam.

4. The transmitter device of claim 1, wherein the second beam is determined based at least in part on a set of power or strength metrics related to a set of frequency offset hypotheses.

5. The transmitter device of claim 1, wherein a transmit beam direction, a receive beam direction, an angle of arrival (AoA), an angle of departure (AoD), or a combination thereof for the second beam is determined based at least in part on the wideband signal.

6. The transmitter device of claim 1, wherein the wideband signal comprises a sequence or signal that is repeated in a frequency domain.

7. The transmitter device of claim 1, wherein the one or more processors are further configured to:
transmit information configuring selection of a set of frequency offset hypotheses for receiving the wideband signal,
wherein the set of frequency offset hypotheses are configured for:
a group of the resource elements,
a group of resource blocks, or
a combination thereof.

8. The transmitter device of claim 1, wherein the report includes information identifying:
all of the set of measurements,
a subset of the set of measurements,
a set of frequency offset values,
a set of angle of arrival (AoA) values,
a set of angle of departure (AoD) values, or
a combination thereof.

9. The transmitter device of claim 8, wherein the report includes an explicit indicator of the information or an identifier associated with a sequence relating to the information.

10. The transmitter device of claim 8, wherein the report is conveyed via a third signal whose configuration corresponds to the information.

11. The transmitter device of claim 1, wherein the one or more processors are further configured to:
receive, from a control node, information identifying the second beam.

12. The transmitter device of claim 11, wherein the information identifying the second beam includes:
quasi co-location information,
positioning information,
beam selection information,
interference management information,
mobility management information, or
a combination thereof.

13. The transmitter device of claim 1, wherein the second beam is determined based at least in part on a correlation between a reference signal and a hypothesis associated with the wideband signal.

14. The transmitter device of claim 1, wherein the wideband signal includes a set of repetitions of a synchronization signal block (SSB) or a channel state information reference signal (CSI-RS).

15. The transmitter device of claim 14, wherein the second beam is determined based at least in part on a determined best resource element offset for receiving a repetition of an SSB or CSI-RS of the set of repetitions of the SSB or CSI-RS.

16. The transmitter device of claim 14, wherein the second beam is determined based at least in part on a random access channel (RACH) report or beam report of a measurement of the set of repetitions of the SSB or CSI-RS.

17. The transmitter device of claim 16, wherein a pointing direction of the second beam is based at least in part on the RACH report or beam report.

18. A receiver device for wireless communication, comprising:
a memory; and
one or more processors, coupled to the memory, configured to:
receive a wideband signal over a first beam, wherein each resource element of the wideband signal has a pointing direction that is different from the pointing direction of each other resource element of the wideband signal;
determine a set of measurements of each resource element of the wideband signal based at least in part on receiving the wideband signal;
transmit a report associated with the set of measurements of each resource element of the wideband signal; and
communicate using a second beam that has a beam direction determined based at least in part on the report associated with the set of measurements of each resource element of the wideband signal.

19. The receiver device of claim 18, wherein the first beam is associated with a first bandwidth and the second beam is associated with a second bandwidth that is narrower than the first bandwidth.

20. The receiver device of claim 18, wherein the second beam is associated with another wideband signal, and wherein communicating using the second beam comprises:
communicate using an analog or digital beamforming configuration for the second beam.

21. The receiver device of claim 18, wherein the one or more processors, to receive the wideband signal, are configured to:
receive the wideband signal using a frequency domain beam sweeping technique, a set of frequency hypotheses, or a combination thereof.

22. The receiver device of claim 18, wherein the second beam is determined based at least in part on a set of power or strength metrics related to a set of frequency offset hypotheses.

23. The receiver device of claim 18, wherein a transmit beam direction, a receive beam direction, an angle of arrival (AoA), an angle of departure (AoD), or a combination thereof for the second beam is determined based at least in part on the wideband signal.

24. The receiver device of claim 18, wherein the wideband signal comprises a sequence or signal that is repeated in a frequency domain.

25. The receiver device of claim 18, wherein the one or more processors are further configured to:
receive information configuring selection of a set of frequency offset hypotheses for receiving the wideband signal,
wherein the set of frequency offset hypotheses are configured for:
a group of the resource elements,
a group of resource blocks, or
a combination thereof.

26. The receiver device of claim 18, wherein the report includes information identifying:
- all of the set of measurements,
- a subset of the set of measurements,
- a set of frequency offset values,
- a set of angle of arrival (AoA) values,
- a set of angle of departure (AoD) values, or
- a combination thereof.

27. The receiver device of claim 26, wherein the report includes an explicit indicator of the information or an identifier associated with a sequence relating to the information.

28. The receiver device of claim 26, wherein the report is conveyed via a third signal whose configuration corresponds to the information.

29. A method of wireless communication performed by a transmitter device, comprising:
- transmitting, using a frequency-domain beam sweeping configuration, a wideband signal over a first beam, wherein each resource element of the wideband signal has a pointing direction that is different from the pointing direction of each other resource element of the wideband signal;
- receiving a report associated with a set of measurements of each resource element of the wideband signal performed by a receiver device; and
- communicating using a second beam that has a beam direction determined based at least in part on the received report.

30. A method of wireless communication performed by a receiver device, comprising:
- receiving a wideband signal over a first beam, wherein each resource element of the wideband signal has a pointing direction that is different from the pointing direction of each other resource element of the wideband signal;
- determining a set of measurements of each resource element of the wideband signal based at least in part on receiving the wideband signal;
- transmitting a report associated with the set of measurements of each resource element of the wideband signal; and
- communicating using a second beam that has a beam direction determined based at least in part on the report associated with the set of measurements of each resource element of the wideband signal.

* * * * *